June 13, 1967   J. KARLOVSKY, JR   3,324,990
ARTICULATED CHAIN TYPE CONVEYOR
Filed May 5, 1966
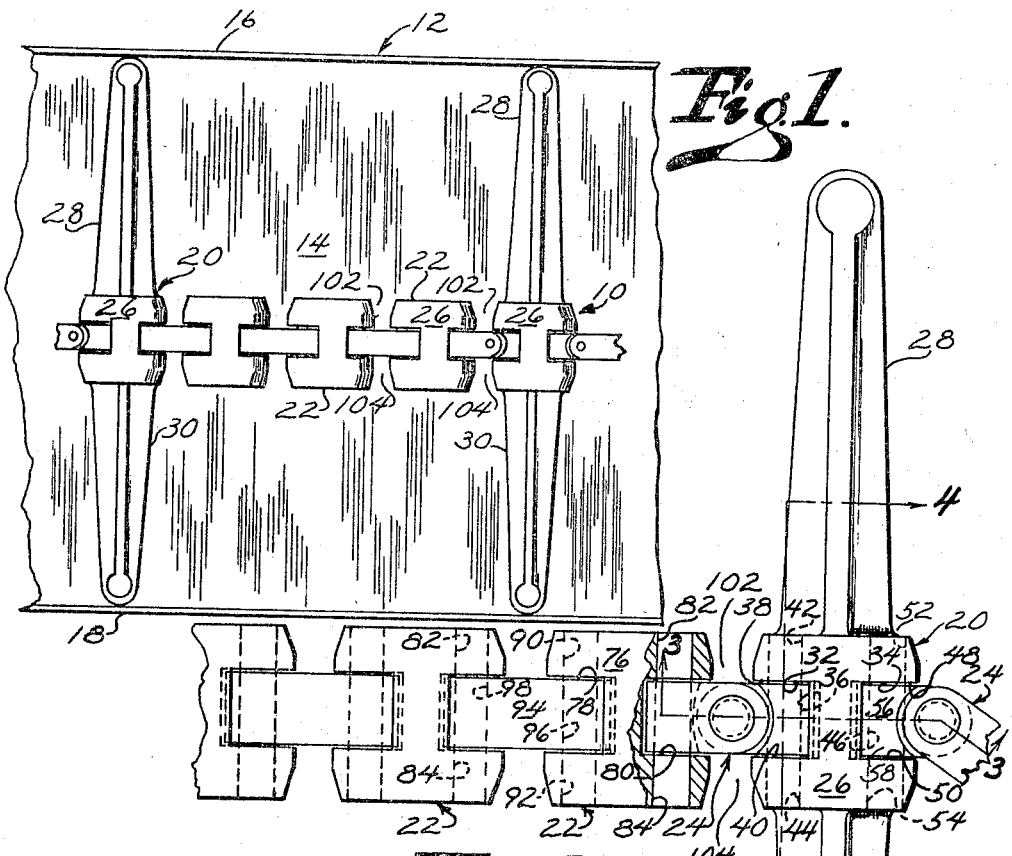
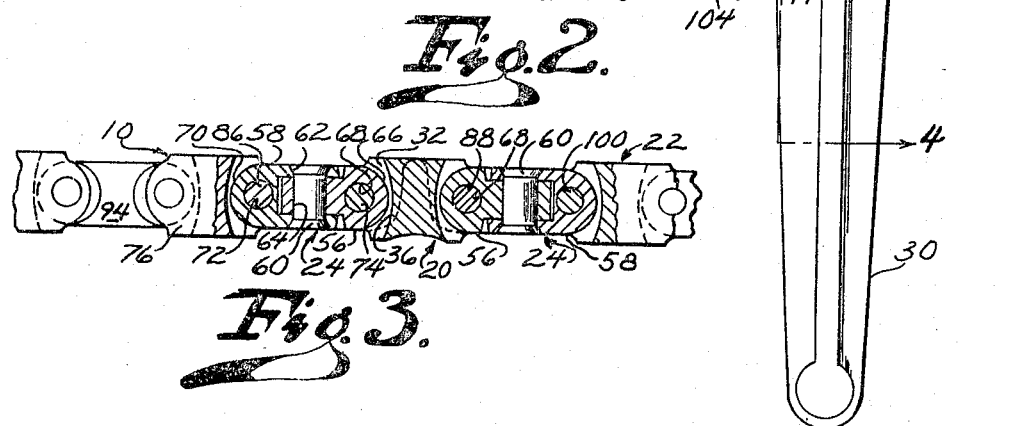
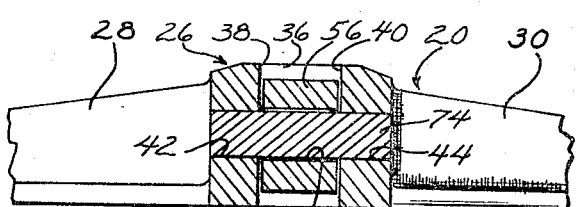
INVENTOR.
JERRY KARLOVSKY JR.
BY Stanley J. Price
His Attorney 3,324,990
ARTICULATED CHAIN TYPE CONVEYOR
Jerry Karlovsky, Jr., Nashville, Ill., assignor to National Mine Service Company, Pittsburgh, Pa., a corporation of West Virginia
Filed May 5, 1966, Ser. No. 547,895
5 Claims. (Cl. 198—171)

This invention relates to an articulated chain conveyor and more particularly to a universally articulated chain conveyor having integral flight elements forming a link element connected to other link elements by universal connecting means.

Chain type conveyors having an endless center chain and laterally extending conveyor flight arms connected thereto are used where horizontal articulation of the conveyor flights takes place while the material is being conveyed in a trough shaped pan section. The laterally extending flight arms have been, in the past, connected to links of the center chain by means of pin connections or the like, as is illustrated in U.S. Patents Nos. 1,920,500, 2,756,868 and 3,103,275. Separate fabrication of the arm portions and the link members to which they are connected increases substantially the overall cost of the chain conveyor. The conventional flight arms include either horizontal or lateral passageways therethrough that are aligned with receiving passageways in the link members that form the body to which the flight arms are secured. Pin type connecting members secure the conveyor flight arms to the link member. For example, as is illustrated in Patent No. 2,756,868, the connecting link includes a pair of lateral passageways therethrough to receive the connecting pins for the flight arms on opposite sides of the conveyor chain. The provision of the specially constructed chain links with the pin receiving passageways therein and the link arms with mating receiving passageways adds substantially to the overall cost of construction of the conveying device.

In other arrangements the universal members are connected to the flight arms by means of pin members that extend through the universal and through receiving passageways in the flight arms. The pin members are thereafter fixedly secured to the arm members by welding or the like to form an integral unit. The assembly and welding operation in the above described conveyor chain adds substantially to the overall cost of fabrication.

I have discovered that it is now possible to substantially reduce the overall fabrication costs of a chain type conveyor by providing an integral unitary conveying flight that has a body portion and a pair of laterally extending flight arms. The unitary conveyor flight serves as a link in the endless chain. The chain links are connected to the conveyor flight by universal connecting means with the conveyor flight forming a part of the universal connection. With this arrangement, it is now possible to provide a chain type conveyor that has the desirable universal connecting means between the chain links and the conveyor flight with an integral flight section.

It has been suggested in the past, as is illustrated in U.S. Patent No. 2,674,365, to provide conveyor flights that have arm members that are formed integrally with an intermediate body section that is connected to the chain links. This construction, however, does not provide the universal connecting members between the pair of adjacent chain links. The universal connections are desirable to provide the desired lateral flexibility for the chain, as is illustrated in U.S. Patents Nos. 2,756,868 and 3,103,275.

Briefly, my invention includes an integral unitary conveyor flight that has a body portion with a pair of laterally extending arms and a pair of horizontal passageways extending through the body portion on opposite sides of the flight arms. The body portion includes a pair of longitudinally spaced recessed portions for receiving an element of the connecting universal. The element of the connecting universal has a horizontal passageway therethrough which, when positioned in the respective recessed portion, is in axial alignment with the horizontal passages in the conveyor flight. A pin member extends through the aligned passageways and pivotally connects the connecting universal element to the conveyor flight body portion to thereby permit vertical pivotal movement of the connecting universal element relative to the conveyor flight body portion. Other elements of the connecting universals are secured to the elements connected to the conveyor flight by means of a vertical pin member extending through aligned connecting apertures to permit horizontal pivoting movement of the universal about the vertical pin member. The connecting links are connected to the last named elements of the connecting universal by means of horizontal pin members. With this arrangement, both the conveyor flight and the connecting link are free to pivot in a vertical plane relative to the connecting universal by the pin connections thereto. The conveyor flights are an integral portion of the endless chain and have the arm members formed integral therewith and function as a portion of the universal connection between the conveyor flight and the connecting link to provide for pivotal movement of the connecting links on opposite sides of the conveyor flight both in a horizontal plane and in a vertical plane. The connecting links and integral flight section are secured to the connecting universal by means of a pin member extending through aligned passageways in the respective flight and connecting universal and other pin members extending through aligned passageways in the connecting universal. It is now possible, with my invention, to connect the unitary conveyor flights to the connecting links of the chain through universal connections by means of pin members secured in passageways provided therefor in the conveyor flight, the connecting link and the connecting universals and to obtain the desired vertical and horizontal articulation essential in the proper operation of an endless chain type conveyor.

Accordingly, the principal object of this invention is to provide a chain type conveyor having the flight arms formed integrally with a link portion of the endless chain and universal connecting means extending from opposite sides thereof.

Another object of this invention is to provide an endless chain type conveyor having conveyor flights with laterally extending flight arms formed integrally therewith and said conveyor flights and connecting links are secured to connecting universals positioned therebetween by means of pin members extending through aligned horizontal passageways in the respective conveyor flight, connecting link and connecting universal.

These and other objects and advantages of this invention will be more completely disclosed and described in the following specification, the accompanying drawings and the appended claims.

In the drawings:
FIGURE 1 is a fragmentary top view of a portion of a flight conveyor chain and its associated trough.
FIGURE 2 is a fragmentary enlarged plan view of the chain conveyor illustrating in partial section the pin connection between the connecting link and the connecting universal and the horizontal pivoting of the connecting universal.
FIGURE 3 is a view in side elevation taken along the lines 3—3 of FIGURE 2 illustrating in section the configuration of the longitudinal recesses in the conveyor flight for receiving an element of the connecting universal.
FIGURE 4 is a view in section taken along the line 4—4 illustrating the passageways and the pin for pivotally connecting an element of the connecting universal to the conveyor flight.

Referring to FIGURE 1 there is illustrated my improved conveyor chain generally designated by the numeral 10 positioned in a conveyor trough generally designated by the numeral 12 that has a deck portion 14 with a pair of upwardly extending side flanges 16 and 18. The conveyor chain 10 has a plurality of conveyor flights generally designated by the numeral 20 connected to links 22 by means of connecting universal members 24. The conveyor flights 20 have a body portion 26 with arm members 28 and 30 formed integrally therewith and extending laterally therefrom. The conveyor flight arm portions 28 and 30 are arranged to convey material along the deck 14 as the endless conveyor chain 10 moves longitudinally in the conveying trough 12.

Referring to the elements of the conveyor chain 10, the conveyor flight 20 has a body portion 26 from which the arm members 28 and 30 extend laterally. It should be noted that the laterally extending arms 28 and 30 are formed integrally with the conveyor flight body portion 26. The body portion 26 has a pair of longitudinal recessed portions 32 and 34 for receiving elements of the connecting universals. The recessed portion 32 has an arcuate rear wall 36 and side walls 38 and 40. The body portion 26 has a pair of aligned passageways 42 and 44 extending therethrough and opening into the recessed portion 32. The recessed portion 34 has a similar arcuate rear wall 46 and side walls 48 and 50. A pair of horizontal passageways 52 and 54 extend through the body portion 26 and open into the recess 34.

As is illustrated in FIGURES 2 and 3, the universal member generally designated by the numeral 24, has a first element 56 pivotally connected to a second element 58 by means of a vertical pin 60 extending through aligned passageways 62 and 64 in the respective elements 56 and 58. The element 56 has an arcuate rear wall 66 and a horizontal passageway 68. Similarly, the element 58 has an arcuate rear wall 70 and a horizontal pssageway 72 extending therethrough. The element 56 is so dimensioned that it fits within the recessed portion 32 of conveyor flight body portion 26 with the passageway 68 aligned with the passageways 42 and 44 in the conveyor flight body portion 26. The diametrical dimension of passageway 68 is slightly larger than the dimension of passageways 42 and 44 and a pin member 74 is positioned in the aligned passageways 42, 68 and 44 preferably with a press fit in the passageways 42 and 44 with the universal element 56 free to pivot thereabout in a vertical plane. With this arrangement, one-half of the universal member 24 is connected to the conveyor flight 20 by means of a single horizontal pin 74 with the universal member being free to pivot about the axis of the pin member 74. The contour of the rear wall 36 in conveyor flight body recessed portion 32 is such that the element 56 is free to pivot vertically relative to the conveyor flight body portion.

The link members generally designated by the numeral 22 have a body portion 76 with longitudinal recessed portions 78 and 80. There are horizontal aligned passageways 82 and 84 extending through the link member body portion 76 adjacent one end that open into the recessed portion 80. The passageway 72 of universal element 58 is aligned with the passageways 84 and 82 in the link body portion 76. A pin member 86 extends through the aligned passageways and is preferably dimensioned to form a press fit in passageways 82 and 84 to thereby secure the universal element 58 to the link member 22. The dimension of passageway 72 in universal element 58 is such that the universal element 58 is free to pivot about the pin member 82 in a vertical plane.

With the above arrangement, the universal elements 56 and 58 are free to pivot in a horizontal plane relative to each other about pin member 60, and the flight 20 and link member 22 are free to pivot in vertical planes relative to the universal member 24. It should be noted that the vertical pin member 60 has expanded head portions that fixedly secure the pin member to universal element 58. The dimension of passageway 64 in universal element 56 is such that the universal element 56 is free to pivot about the pin 60.

The universal member 24' is similar in construction to the universal member 24 previously described and similar numerals are employed to designate similar parts. The universal element 56 of universal member 24' is positioned in the conveyor flight body recessed portion 34 with the passageway 68 aligned with passageways 52 and 54 in the conveyor flight body portion 26. A pin member 88 extends through the aligned passageways 52, 68 and 54 and pivotally secures the universal element 56 to the conveyor flight body portion 26. The pin member 88 is preferably so dimensioned that it is a press fit in passageways 52 and 54 and the universal element 56 is free to pivot about the pin 88. With this arrangement, the universal members 24 and 24' are both free to pivot in a vertical plane relative to the conveyor flight 20 and are connected to the flight 20 by the pins 74 and 88 secured in the passageways in the flight body portion 26. The universal members 24 and 24' both include a vertical pin member about which the universal elements are free to pivot in horizontal planes so that there is a universal connection between the adjacent links 22 and the conveyor flights 20.

The link member body portion 76 has a second pair of passageways 90 and 92 that open into the recessed portion 78. A connecting member 94 has a pair of horizontal passageways 96 and 98 adjacent the end portions. The connecting member 94 is positioned between a pair of links 22 with passageways 96 and 98 aligned with respective passageways 90–92 and 82–84. Pin members similar to pin 86 extend through the aligned passageways and pivotally connect member 94 to links 22 so that the links 22 are free to pivot in a vertical plane. The number of links 22 and connecting members 94 positioned between the conveyor flights 20 is dependent to a great extent on the material being conveyed.

The front end of universal member 24' is connected to link 22' (FIG. 3) by aligning passageways 90 in link 22' with passageway 72 in universal element 58 and providing a press fit pin 100 to permit the universal element 58 to pivot about pin 100 in a vertical plane.

As will be apparent from the above description with my invention it is now possible to fabricate and assemble a chain conveyor with a minimum of labor. The conveyor flights 20 are provided with horizontal pin receiver passageways on opposite ends thereof and longitudinal recessed portions for the universal members. The universal members are secured to the conveyor flight by means of horizontal pins extending through the respective passageways. Thus the universal members are connected to the conveyor flight by pin members. Similarly, the links 22 are connected to the universal members by pins extending through horizontal aligned passageways. With my construction, it is now possible to eliminate the previous assembly steps required in securing the separate flight arms to the universal elements by welding or the like.

My chain conveyor 10 is preferably propelled with a double sprocket arrangement wherein the sprockets are positioned so that the sprocket teeth extend upwardly on opposite sides of the connecting links 94 and universal members 24 in the spaces indicated by the numerals 102 and 104 in FIGURES 1 and 2.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:
1. In an articulated chain type conveyor the combination comprising:
   a conveyor flight having a body portion,
   a pair of arm members formed integrally with said body portion and extending laterally therefrom on opposite sides thereof,
   said body portion having a front end portion and a rear end portion,
   said body front end portion having a first recessed portion extending longitudinally thereof and terminating in an arcuate rear wall,
   said body rear end portion having a second recessed portion extending longitudinally thereof and terminating in a second arcuate rear wall,
   said body front end portion having a first transverse horizontal passageway therethrough opening into said first recessed portion,
   said body rear end portion having a second transverse horizontal passageway therethrough opening into said second recessed portion,
   a first universal member having a pair of elements pivotally connected to each other for rotation about a vertical axis, one of said elements having a transverse horizontal passageway therethrough adjacent an end portion,
   said last named element positioned in said flight body portion first recessed portion with said horizontal passageway aligned with said first transverse horizontal passageway in said flight body front end portion,
   a first pin member extending through said aligned passageways and pivotally securing said first universal member to said flight body portion for rotation about the axis of said first pin member,
   a second universal member having a second pair of elements pivotally connected to each other for rotation about a vertical axis, one of said second elements having a transverse horizontal passageway therethrough adjacent an end portion,
   said last named element positioned in said flight body portion second recessed portion with said transverse horizontal passageway aligned with said second transverse horizontal passageway in said flight body rear end portion, and
   a second pin member extending through said last named aligned passageways and pivotally securing said second universal member to said flight body portion for rotation about the axis of said second pin member.

2. An articulated chain type conveyor as set forth in claim 1 in which:
   the diametrical dimension of said horizontal passageways in said universal elements is larger than the diametrical dimension of said transverse horizontal passageways in said body portion,
   said pin members having a diametrical dimension smaller than the diametrical dimension of said horizontal passageways in said universal elements so that said universal elements positioned on said pin members are rotatable relative thereto, and
   said pin members and said transverse horizontal passageways in said body portion having diametrical dimensions so that said pin members are frictionally engaged in said transverse horizontal passageways.

3. An articulated chain type conveyor as set forth in claim 1 in which each of said universal members include,
   a first element having a vertical passageway adjacent one end and a horizontal passageway adjacent the other end,
   a second element having a vertical passageway adjacent one end and a horizontal passageway adjacent the other end,
   said elements arranged with said vertical passageways aligned and a pin member extending therethrough to pivotally connect said elements to each other for rotation about said pin member.

4. An articulated chain type conveyor as set forth in claim 3 in which said universal member elements include,
   an arcuate end wall adjacent said horizontal passageways, said arcuate end walls of said universal elements spaced from said conveyor flight recessed portion arcuate end walls to permit pivotal movement of said universal element about said horizontal pin member.

5. An articulated chain type conveyor as set forth in claim 3 which includes,
   link members having a front longitudinal recessed portion and a rear longitudinal recessed portion,
   a pair of spaced horizontal passageways opening into said recessed portions,
   said universal members secured to opposite ends of said conveyor flight body portion having elements positioned in a recessed portion of a link member with said horizontal passageway aligned with said link member horizontal passageways, and
   pin members pivotally securing said link members to said universal members for pivotal movement about said pin members.

References Cited
UNITED STATES PATENTS 2,994,422   8/1961   Dalrymple _____ 198—176

EVON C. BLUNK, *Primary Examiner.*

E. A. SROKA, *Assistant Examiner.*